US012810301B2

(12) United States Patent
Mohankumar et al.

(10) Patent No.: US 12,810,301 B2
(45) Date of Patent: Nov. 24, 2026

(54) SYSTEMS AND METHODS FOR EARLY FRAUD DETECTION IN DEFERRED TRANSACTION SERVICES

(71) Applicant: PAYPAL, INC., San Jose, CA (US)

(72) Inventors: Padmapriya Mohankumar, Chennai (IN); Ashraf Kamal, New Delhi (IN); Vishal Kumar Singh, Howrah (IN)

(73) Assignee: PAYPAL, INC., San Jose, CA (US)

( * ) Notice: Subject to any disclaimer, the term of this patent is extended or adjusted under 35 U.S.C. 154(b) by 69 days.

(21) Appl. No.: 18/521,212

(22) Filed: Nov. 28, 2023

(65) Prior Publication Data

US 2025/0173726 A1 May 29, 2025

(51) Int. Cl.
*G06Q 20/40* (2012.01)
*H04L 9/40* (2022.01)

(52) U.S. Cl.
CPC ....... *G06Q 20/4016* (2013.01); *H04L 63/102* (2013.01)

(58) Field of Classification Search
CPC ..... H04L 63/102; H04L 63/108; H04L 63/12; H04L 63/1475; H04L 63/123; H04L 63/1408; H04L 63/1416; H04L 63/1441
USPC .......................................... 709/220, 224–229
See application file for complete search history.

(56) References Cited

U.S. PATENT DOCUMENTS 9,754,255 B1 9/2017 Ma
10,290,053 B2 5/2019 Priess
10,559,299 B1 * 2/2020 Arel ........................ G06N 20/00
10,789,530 B2 9/2020 Bruss
10,937,023 B2 3/2021 Kote
10,977,654 B2 4/2021 Kumar
11,593,773 B1 2/2023 Yip
11,937,073 B1 * 3/2024 Mobin .................... H04S 7/305

(Continued)

FOREIGN PATENT DOCUMENTS

CA 2829503 A1 * 9/2012 ......... G01N 33/6893
CA 2795554 C * 7/2021 ............. G16B 40/30
EP 4465196 A1 * 11/2024 ............. G06N 20/00

OTHER PUBLICATIONS

Non-final Office Action from U.S. Appl. No. 18/521,115, dated Sep. 11, 2025, 25 pp.

(Continued)

*Primary Examiner* — Khanh Q Dinh
(74) *Attorney, Agent, or Firm* — Greenberg Traurig, LLP

(57) ABSTRACT

A computer-implemented method for utilizing a machine learning model configured to determine synthetic identity theft may include processing a plurality of user datasets to generate a set of features for each user dataset, with each set of features being representative of a particular user. The method may further include generating a plurality of embeddings sets, with each embedding set being representative of a respective set of features, generating a plurality of synthetic user datasets, combining the plurality of embeddings sets and the plurality of synthetic user datasets to generate a training dataset, the training dataset comprising a plurality of user profiles, training the machine learning model based on the generated training dataset, and determining, via the machine learning model and in response to receiving a new user profile, a determination of whether the new user profile is real or synthetic.

20 Claims, 10 Drawing Sheets

(56) References Cited

U.S. PATENT DOCUMENTS

| | | | | |
|---|---|---|---|---|
| 12,132,267 | B1 * | 10/2024 | Duong | H04W 24/02 |
| 12,141,675 | B1 * | 11/2024 | Duong | H04B 7/024 |
| 12,143,541 | B2 * | 11/2024 | Gish | H04M 9/08 |
| 12,164,619 | B1 * | 12/2024 | Rodriguez | G06F 21/32 |
| 12,169,889 | B2 * | 12/2024 | Phan | G06N 3/0455 |
| 12,185,134 | B1 * | 12/2024 | Duong | H04W 24/02 |
| 12,591,772 | B1 * | 3/2026 | Ouyang | G06N 3/0455 |
| 2008/0267999 | A1 * | 10/2008 | Tainsky | A61P 19/00 435/6.12 |
| 2011/0238575 | A1 | 9/2011 | Nightengale | |
| 2021/0182851 | A1 | 6/2021 | Albisu | |
| 2021/0241120 | A1 * | 8/2021 | Chen | A61L 29/06 |
| 2022/0076252 | A1 | 3/2022 | Prabhu | |
| 2022/0277097 | A1 * | 9/2022 | Cabot | H04W 12/02 |
| 2023/0020968 | A1 | 1/2023 | Zhai | |
| 2023/0052407 | A1 | 2/2023 | Mcgrandle | |
| 2023/0056491 | A1 | 2/2023 | Sells | |
| 2023/0401336 | A1 * | 12/2023 | LaFever | G06F 21/6245 |
| 2024/0346731 | A1 * | 10/2024 | Graham | G06N 3/044 |
| 2024/0427856 | A1 * | 12/2024 | Vemireddy | G06F 21/30 |
| 2024/0427916 | A1 * | 12/2024 | Matos | G06F 21/6218 |
| 2025/0045591 | A1 * | 2/2025 | Eng | G06N 3/04 |
| 2025/0141760 | A1 * | 5/2025 | Coudert | H04L 41/16 |
| 2025/0173707 | A1 * | 5/2025 | Mohankumar | G06Q 20/405 |
| 2025/0173726 | A1 * | 5/2025 | Mohankumar | G06N 20/20 |

OTHER PUBLICATIONS

"Are BNPL cards riskier than credit cards?" Jun. 7, 2022, 8 pp., https://bankquality.com/blog/are-bnpl-cards-riskier-than-credit-cards/.

"What is Gyroscope?" Privacy Policy, https://gyrosco.pe/privacy/, retrieved Aug. 29, 2023, 16 pp.

CNBC Select, "A new CFPB report reveals the credit habits of 'buy now, pay later' users—here's what you need to know," May 16, 2023, 11 pp., https://www.cnbc.com/select/financial-profile-buy-now-pay-later-userscfpb/#:~:text=For%20example%2C%209%25%20of%20BNPL,who%20didn%27t%20use%20BNPL.

Consumer Financial Protection Bureau, "Buy Now, Pay Later: Market trends and consumer impacts," Sep. 2022, 83 pp. https://files.consumerfinance.gov/f/documents/cfpb_buy-now-pay-later-market-trends-consumer-impacts_report_2022-09.pdf.

Consumer Financial Protection Bureau, "Should you buy now and pay later?" Jul. 6, 2021, 6 pp.

Cult MTL, "BNPL—Impact on the behavior of customers," Sep. 24, 2021, 8 pp. https://cultmtl.com/2021/09/bnpl-impact-on-the-behavior-of-customers/.

Enhalo, "GDPR Data and Irregular Behavior Detection," Sep. 14, 2021, 11 pp., https://enhalo.co/security-services/gdpr-data-theft-protecting-irregular-behavior/.

Enzoic, "Account Takeover Defined," accessed Aug. 29, 2023, 5 pp., https://www.enzoic.com/blog/account-takeover-atodefinition/#:~:text=What%20is%20the%20difference%20between,account%20by%20a%20threat%20actor.

FICO Blog, "Buy now, pay later: BNPL Fraud and Regulatory Update," Oct. 7, 2022, 7 pp., https://www.fico.com/blogs/buy-now-pay-later-bnpl-fraud-and-regulatory-update.

Investopedia, "Buy Now, Pay Later vs. Credit Cards," updated Mar. 22, 2023, 9 pp. https://www.investopedia.com/buy-now-pay-later-vs-credit-cards-5188052.

Kroger et al., "Privacy Implications of Accelerometer Data: A Review of Possible Inferences," ICCSP 2019, Jan. 19-21, 2019, Kuala Lumpur, Malaysia, 7 pp.

Lia, "Buy-Now-Pay-Later (BNPL): Generation Z's Dilemma on Impulsive Buying and Overconsumption Intention," Advances in Economics, Business and Management Research, vol. 193, Proceedings of the BISTIC Business Innovation Sustainability and Technology, International Conference (BISTIC 2021), 8 pp.

M2P, "Factors and Psychology Behind the Great BNPL Allure" Apr. 29, 2022 (updated May 16, 2023), https://m2pfintech.com/blog/factors-and-psychology-behind-the-great-bnpl-allure/, 10 pp.

Nickled & Dimed, "Penny for your thoughts? Understanding 'Buy Now Pay Later' Industry Regulations by RBI," Oct. 4, 2022, 9 pp. https://nickledanddimed.com/2022/10/04/understanding-buy-now-pay-later-industry-regulations-by-rbi/.

Seon, "What is credential stuffing?," accessed Aug. 29, 2023, 7 pp., https://seon.io/resources/credential-stuffing/#h-what-is-credential-stuffing.

Estimated and Incremental Authorization and Reversal Processing Requirements for Visa Merchants (Year: 2023).

Non-final Office Action from U.S. Appl. No. 18/521,115, dated Jun. 10, 2026, 34 pp.

Payment processing explained: What it is and how it works (Year: 2023).

Payments 101: Card Networks & Transactions (Year: 2022).

* cited by examiner

SYSTEMS AND METHODS FOR EARLY FRAUD DETECTION IN DEFERRED TRANSACTION SERVICES

TECHNICAL FIELD

The instant disclosure relates to providing improved security and trust in deferred transaction services.

BACKGROUND

Various deferred transaction services (e.g., deferred payment services) are available to transacting buyers, and are structured such that a buyer may purchase a product or service for the promise of payment to-come. In essence, a buyer is able to apply for a deferred transaction service for specific products and/or services, and upon approval, purchase a product or service from a merchant upfront and split the cost of the transaction for the product or service into installments over a period of time. These services may increase the purchase-power of a buyer who can afford to pay in installments but not in a single lump-sum.

DETAILED DESCRIPTION

Deferred transaction services (e.g., deferred payment services) include short-term financing services, such as, for example, a Buy-Now-Pay-Later ("BNPL") service in which a buyer receives a product immediately but does not pay for the product until a later date (or on a later schedule). Functionally, such a transaction operates as a loan with the "purchased" product as the "principal" for the loan that is paid-off over time. As such, this type of transaction carries many of the same risks as a traditional loan, albeit on a (generally) lower scale. For example, there is a risk that the buyer may default on the payments, or may use fraudulent data to qualify for the deferred transaction service. However, many options for combatting these risks either have a material effect on buyers beyond the transaction itself (e.g., a "hard" credit check) or may defeat the purpose of a deferred transaction service and payment plan in the first place (e.g., a larger down-payment). Other options, such as a standard "soft" credit check, may not provide a sufficiently thorough review to reduce the associated risk.

Transactions associated with deferred transaction services possess an inherently higher risk than credit card transactions. The qualification process for deferred transaction services is significantly lower than approval for a credit card, meaning that it is easier for bad actors to abuse the system. For example, credit card companies typically perform a "hard" credit check as part of the application. This also means that individuals with poor credit may not have access to credit cards, leaving them with deferred transaction services as their only option for deferred payments. Finally, due to being a more-emerging technology than credit cards, deferred transaction services may be less regulated by governments, leading to fewer consumer protections.

Accordingly, there exists a need for a system that can review requests for deferred transaction services, including short-term financing services such as BNPL requests without prejudicing buyers and without exposing sellers to unreasonable risk. In addition, it is important that this system be capable of scaling to meet demand, as a system that effectively screens for risk but at the cost of inhibiting throughput is unhelpful. Furthermore, as mobile transactions are increasingly common, there is a need for a system that is portable and capable of working with person-to-person lending, micro-financing, non-banking financial companies (NBFC) lending services, small business loans, etc.

Figure 1:
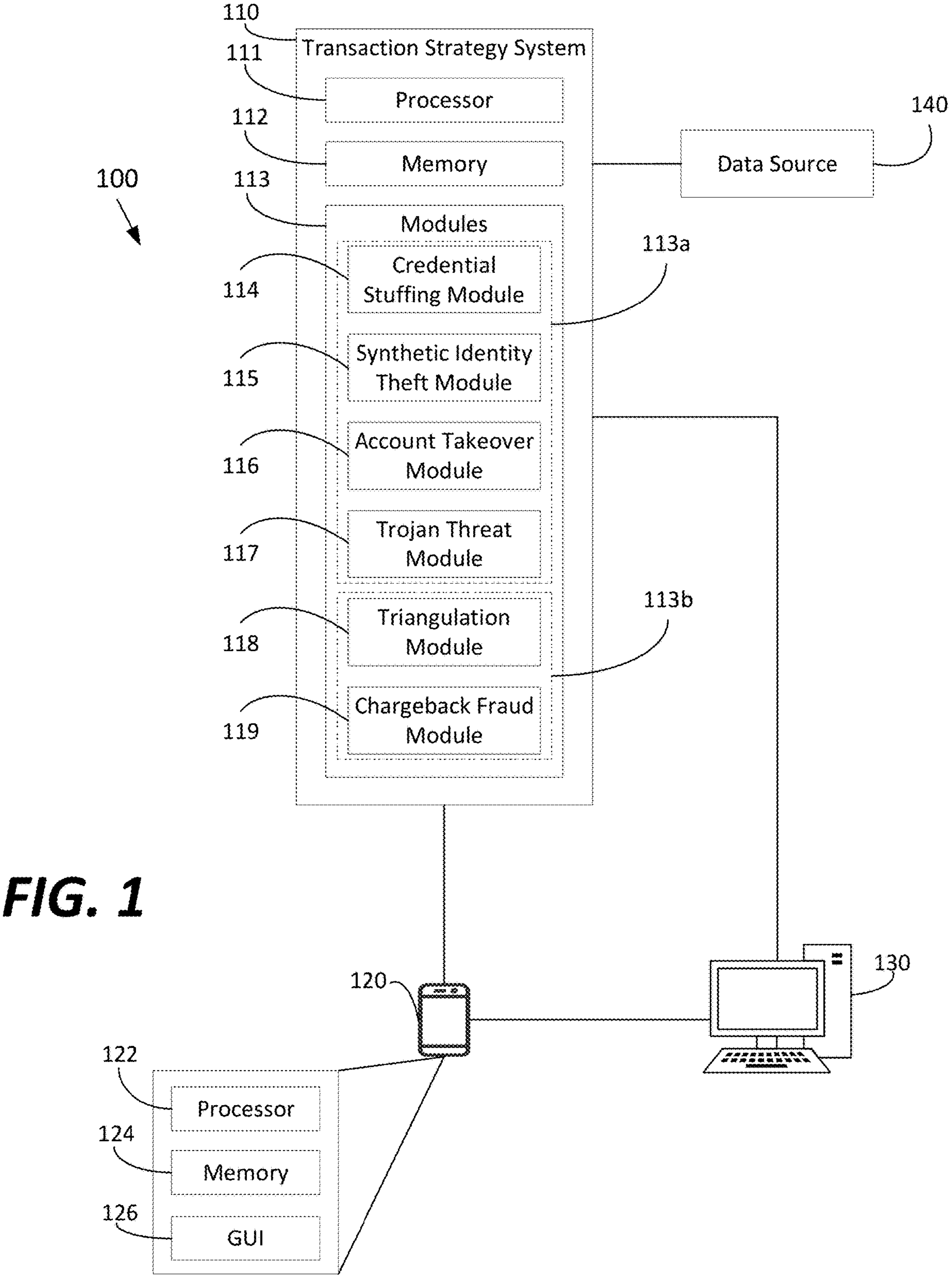
FIG. 1 is a block diagram of an example system for processing transaction requests.

Referring to the drawings, wherein like reference numerals refer to the same or similar features in the various views, FIG. 1 is a block diagram of an example system 100 for processing deferred transaction service requests to review for fraudulent activity. The system 100 may include a transaction strategy system 110, a user device 120, a merchant server 130 (e.g., a merchant device 130), and a data source 140, which may be in electronic communication with one another and/or with other components via a network. The network may include any suitable connection (or combinations of connections) for transmitting data to and from each of the components of the system, and may include one or more communication protocols that dictate and control the exchange of data.

As shown, the transaction strategy system 110 may include one or more functional modules 113 embodied in hardware and/or software. In an embodiment, the functional modules 113 of the transaction strategy system 110 may be embodied in a processor 111 and a memory 112 (i.e., a non-transitory, computer-readable medium) storing instructions that, when executed by the processor 111, cause the transaction strategy system 110 to perform the functionality of one or more of the functional modules 113 and/or other functionality of this disclosure. For example, the transaction strategy system 110 may review and selectively approve a request from a user to structure a purchase through a deferred transaction service, such as a Buy-Now-Pay-Later ("BNPL") service, and may facilitate the purchase with a merchant.

The user device 120 may include a processor 122 and a memory 124, which may be any suitable processor and memory. In particular, the user devices 120 may be mobile devices (e.g., smartphones, tablets, laptops, etc.). The memory 124 may store instructions that, when executed by the processor 122, cause a graphical user interface (GUI) 126 to display on the user device 120. This GUI 126 may be provided, in part, by the transaction strategy system 110 and, particularly, one of the functional modules 113 of the transaction strategy system 110. The GUI 126 may enable the initial request, and may facilitate the additional collection of data by the transaction strategy system 110 for approving and/or executing the payment plan.

The data source 140 may be any suitable database or data storage component configured to digitally house data for use by the transaction strategy system 110. In some embodiments, the transaction strategy system 110 may receive data from the data source 140 in response to requests from the transaction strategy system 110, and the transaction strategy system 110 may send data to the data source 140 for storage. The data source 140 may also receive and store data from publicly-available sources, such as social media websites, public transaction records, or previous transaction histories involving the transaction strategy system 110 (e.g., previous transactions associated with a deferred transaction service).

The functional modules 113 may include two sets of modules: a first set 113*a* configured to receive a request to access the transaction strategy system 110 and to selectively improve the access request; and a second set 113*b* of modules configured to review the particulars of the underlying transaction associated with the access request and to facilitate the transaction. As such, the transaction strategy system 110 may utilize different modules 113 at different stages of a transaction. For example, the transaction strategy system 110 may apply some or all of the first set 113*a* at the initial stage of the transaction and may apply some or all of the second set 113*b* at any subsequent stage. In another example, the transaction strategy system 110 may apply the second set 113*b* at an earlier stage of the transaction and may apply the first set 113*b* at any subsequent stage.

The functional modules 113 may include a credential stuffing module 114 configured to determine if the request associated with the user device 120 is an attempt to improperly access the transaction strategy system 110 by making repeated requests using variations of log-in credentials, which is a process referred to as "credential stuffing." In addition to the obvious harm caused by a fraudulent actor gaining access to the transaction strategy system 110, credential stuffing attempts serve to overwhelm the processor 111 and are technologically undesirable. The credential stuffing module 114 may be included in the first set 113*a* of modules. The transaction strategy system 110 may be maintained by or provided via a service provider such as PAYPAL®, Inc. of San Jose, CA, USA.

Figure 3:
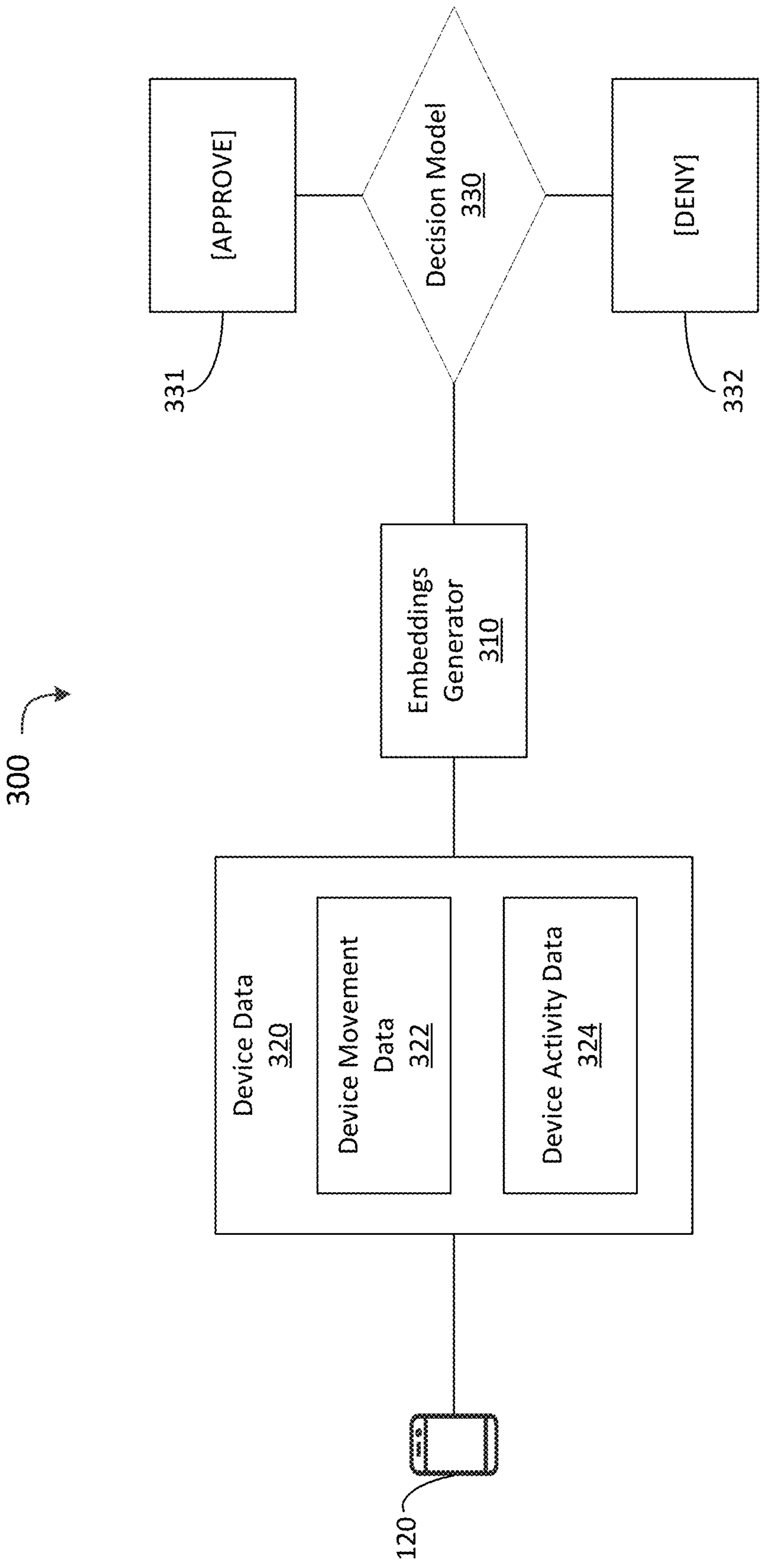
FIG. 3 is a block diagram of a module of the example system of FIG. 1.

FIG. 3 is a block diagram of an embodiment 300 of the credential stuffing module 114. As shown in FIG. 3, the credential stuffing module 114 may access device data 320 from the user device 120. The device data 320 may be included by the user device 120 as part of the initial request, or may be requested by the credential stuffing module 114 in response to the transaction strategy system 110 receiving the access request from the user device 120. For example, in some embodiments, after receiving the request for the deferred transaction service, the transaction strategy system 110 or modules 113 of the transaction strategy system 110 may request and receive device data 320 from the user device 120. In some embodiments, the device data 320 may not be stored by the credential stuffing module 114 in order to comply with applicable privacy regulations, such that the device data 320 may be accessed but not recorded.

The device data 320 may include two types of data: device movement data 322 and device activity data 324. The device movement data 322 may be recorded by one or more of an accelerometer, a gyroscope, or magnetometer included with hardware of the user device 120, such that the device movement data 322 may include data indicative of a movement pattern, orientation, placement, or position of the user device 120. The device movement data 322 may be from a defined period of time (e.g., from the 10 minutes immediately prior to the request, 1 hour immediately prior to the request, etc.) to reduce the amount of data to a reasonably-processable quantity while still providing actionable information. The credential stuffing module 114 may process these "raw" data to determine one or more actions associated with the data in order to inform a pattern of behavior. For example, the credential stuffing module 114 may determine that the device movement data 322 are indicative of a user standing with the user device 120, walking up stairs with the user device, and then setting the user device 120 down to eat.

The device activity data 324 may be indicative of interactions by the user with the user device 120, including applications accessed, messages sent, and transactions conducted, for example. The credential stuffing module 114 may process these "raw" data to derive environmental characteristics to further inform the pattern of behavior. In some embodiments, these environmental characteristics may include cognitive factors (e.g., thoughts, beliefs, cognitions, self-talk, etc.), behavioral factors (e.g., actions, behaviors, etc.), emotional factors (e.g., feelings, moods, emotions, etc.), and physiological factors (e.g., biology, genetics, physical attributes, physiology, etc.). These environmental characteristics may be derived from activity logs on the user device, as well as from a stored history of interactions by the user with the underlying system 110. For example, the credential stuffing module 114 may determine that a user recently used the user device 120 to access a video, and the action of viewing a video and the content of the video may be used by the credential stuffing module 114 to inform the user's environmental characteristics.

The credential stuffing module 114 may combine the processed device movement data 322 and device activity data 324 to generate a pattern of behavior for the user associated with the user device 120. This combination may include reducing noise in the data (e.g., removing extraneous or irrelevant movements), normalizing the data (e.g., adjusting for a walking speed of the user), and/or segmenting the data (e.g., breaking the pattern into discrete chunks of actions). The credential stuffing module 114 may then utilize an embeddings generator 310 to generate an embeddings vector representative of the derived pattern of behavior.

The generated embeddings vector may be processed, as input, by a trained decision model 330 that either approves, at 331, the associated user (e.g., the request to access the transaction strategy system 110 that initiated the credential stuffing module 114) or denies, at 332, the associated user. The decision model 330 may be trained based on past patterns of behavior that are associated with either legitimate users or illegitimate (e.g., fraudulent) users. Accordingly, the decision model 330 may determine that the embeddings vector is similar to an embeddings vector expected for a legitimate user, and may approve 331 the user in response. Alternatively, the decision model 330 may determine that the embeddings vector is similar to an embeddings vector expected for an illegitimate user, and may deny 332 the user in response.

The functional modules 113 may include a synthetic identity theft module 115 configured to determine if credentials provided with the request are associated with a real person and are not a "synthetic identity" created to fool the transaction strategy system 110. In contrast to credential stuffing (in which a fraudulent actor attempts to identify user credentials associated with a real user), synthetic identity theft involves fabricating at least a portion of a user's identity in order to gain access to a restricted system (e.g., the transaction strategy system 110). For example, a profile involved in synthetic identity theft may include a birthday and social security number associated with a real person, but with falsified address data, names, and other biographical information. The synthetic identity theft module 115 may be included in the first set 113*a* of modules.

Figure 4:
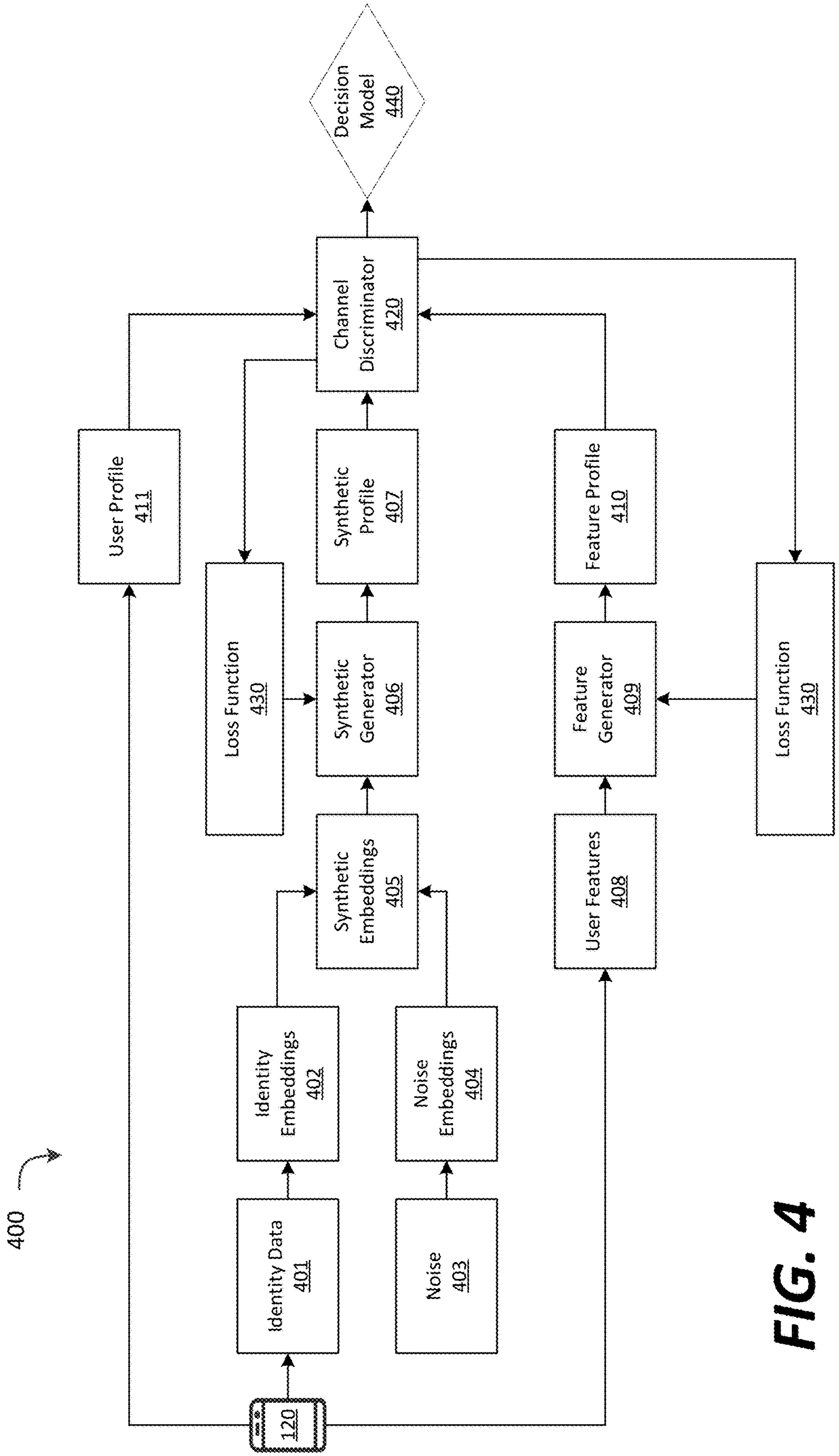
FIG. 4 is a block diagram of a module of the example system of FIG. 1.

FIG. 4 is a block diagram illustrating an example flow 400 of the synthetic identity theft module 115. Generally speaking, the flow 400 involves training a channel discriminator 420 to determine whether a profile is synthetic via three separate types of profile data: actual user data (e.g., user profile 411), partially-synthetic data (e.g., synthetic identity profile 407), and fully-synthetic data (e.g., feature profile 410). Output from the channel discriminator 420 may be used to train the models that generate the partially- and fully-synthetic data, which, in turn, generate additional data for training the channel discriminator 420. By training these data-generating models in parallel and in order to generate more "realistic" data (e.g., data more capable of "tricking" the discriminator 420 into thinking the data is not-synthetic), the channel discriminator 420 may be trained via "adversarial training," which refers to the two different training processes working towards opposite goals (e.g., objective functions).

As shown in FIG. 4, identity data 401 may be received from (e.g., extracted from, retrieved from, sent from, etc.) user device 120. In some embodiments, identity data 401 may be received in real-time, such that the synthetic identity theft module 115 is continually receiving new identity data 401 for use in training as additional individuals register or supplement their profiles in the system 110. The synthetic identity theft module 115 may generate identity embeddings 402 based on the identity data 401, such that the identity embeddings 402 represents one or more characteristics of the identity data 401 in a dimensional space. In parallel, the synthetic identity theft module 115 may receive, generate, or otherwise obtain noise data 403, and may generate noise embeddings 404 based on the noise data 403. By combining (e.g., concatenating) the identity embeddings 402 and the noise embeddings 404, the synthetic identity theft module 115 may generate synthetic embeddings 405 that may each represent a synthetic identity (e.g., an identity containing both real and fabricated information). The synthetic identity theft module 115 may train synthetic generator 406 with the synthetic embeddings 405, such that the synthetic generator 406 may be configured to generate (e.g., create, fabricate, etc.) a synthetic identity profile 407.

In parallel, the synthetic identity theft module 115 may derive a user profile 411 from the user device 120. The user profile 411 may be a particular profile associated with the user of the user device 120, and may contain similar data to the identity data 401. However, in contrast to the identity data 401, the user profile 411 may not be adjusted, amended, or otherwise changed before being processed by the channel discriminator 420.

In parallel, the synthetic identity theft module 115 may extract user features 408 from the user device 120. Rather than maintaining an entirety of a user profile 411, the extracted user features 408 may include discrete datapoints that, when combined, would form a user profile 411. Accordingly, the user features 408 may include the same data as the user profile 411 (and the identity data 401) but with different organization and structure. The extracted user features 408 may be used to train a feature generator 409 that, like the synthetic generator 406, may be configured to output a profile. However, in contrast to the synthetic profile 407, the feature profile 410 may include entirely-fabricated data based on a combination of user features 408, rather than the synthetic profile 407 including a mixture of real data and noise-based, fabricated data.

The channel discriminator 420 may be trained by the synthetic profile 407, the feature profile 410, and the user profile 411, in order to receive, as input, a profile associated with a request for a deferred transaction service, such as, for example, a short term lending service, and may generate, as output, a synthetic score indicative of an extent to which the received profile contains synthetic (e.g., fabricated) data. For example, a synthetic score of '100' may indicate that the channel discriminator 420 determines that all of the data in the corresponding profile is fabricated, while a synthetic score of '50' may indicate that the channel discriminator 420 determines that half of the data in the corresponding profile is fabricated. In practice, a decision model 440 may receive the synthetic score from the channel discriminator 420 and may selectively approve (or deny) the request.

Training the channel discriminator 420 may include inputting one of the synthetic profile 407, the feature profile 410, or the user profile 411, and adjusting the channel discriminator 420 based on whether the output of the discriminator 420 matches an expected output. For example, the channel discriminator 420 may be expected to output a synthetic score of '0' in response to receiving a user profile 411 as input, while the channel discriminator 420 may be expected to output a synthetic score of '100' in response to receiving a feature profile 410 as input.

In addition to training the channel discriminator 420 based on the difference between actual and expected outputs, this difference may be received, as input, by a loss function 430 configured to adjust each of the synthetic generator 406 and the feature generator 409. As described above, each of the synthetic generator 406 and the feature generator 409 may be trained in order to generate partially- or fully-synthetic profiles. Accordingly, a desired outcome (e.g., objective) for the synthetic generator 406 and the feature generator 409 may be to generate a profile that the channel discriminator 420 assigns a low synthetic score, thereby "tricking" the channel into treating a synthetic profile as real. Put differently, a "positive" outcome for the synthetic generator 406 and the feature generator 409 may be the same as a "negative" outcome for the channel discriminator 420. As such, the training process for the channel discriminator 420 may be an "adversarial" training process, with the channel discriminator and the generators 406, 409 being concurrently trained to, colloquially-speaking, "beat" each other.

Figure 5:
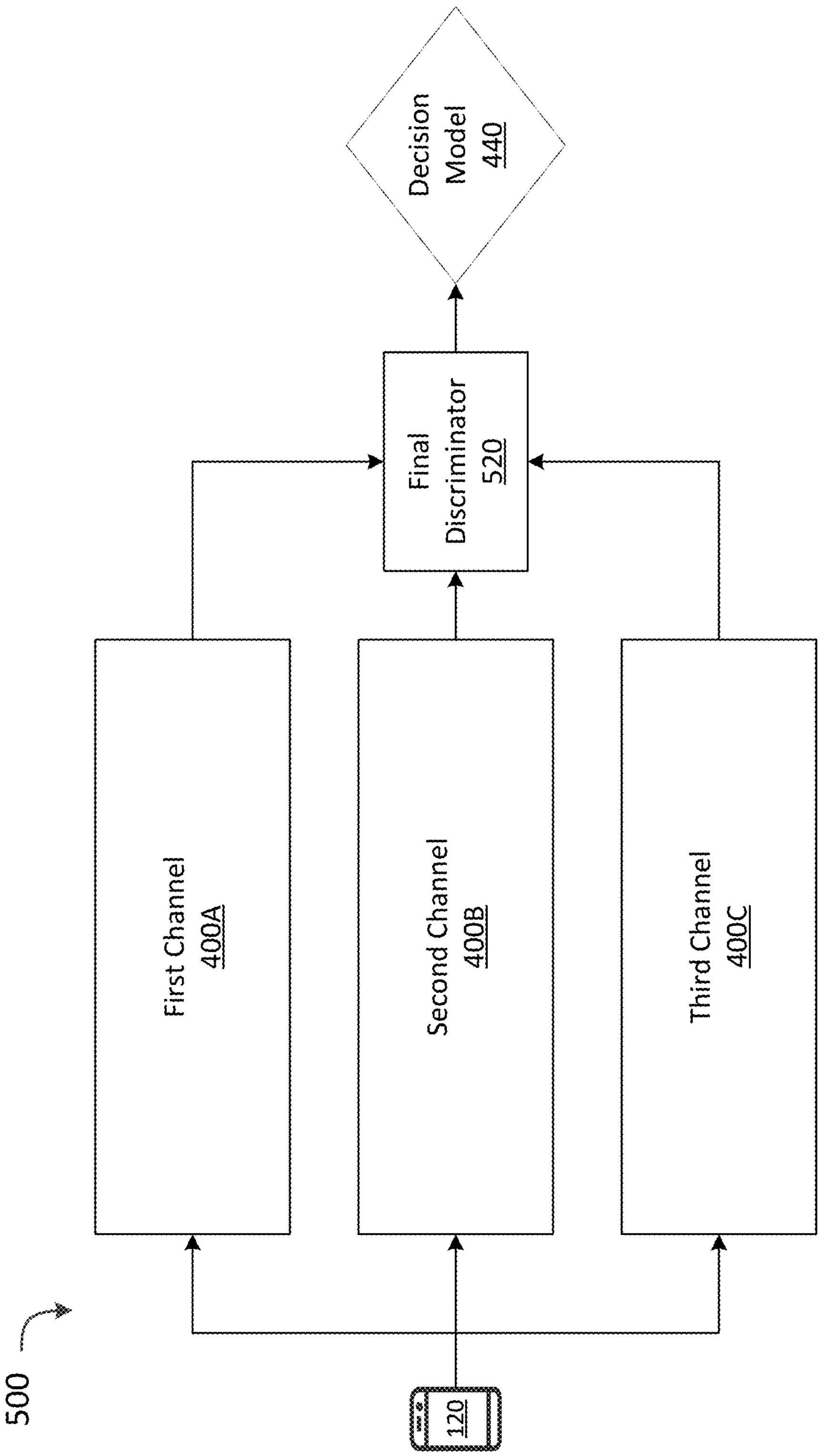
FIG. 5 is a block diagram of the module of FIG. 4.

In some embodiments, such as the block diagram shown in FIG. 5, the flow 400 may be duplicated and run in parallel, with a first channel 400A, a second channel 400B, and a third channel 400C each feeding a final discriminator 520 that, in turn, feeds the decision model 440. In some embodiments of the flow 500, each channel may utilize a different starting data set (e.g., based on a different user device 120, based on a different set of users, based on a different category of users, etc.). In other embodiments of the flow 500, each channel may process data related to a particular category of data (e.g., temporal, spatial, semantic, syntactic, etc.). In this way, the final discriminator 520 may be more completely trained by first fine-tuning the corresponding channel discriminator 420 for each of channels 400A-C, thereby accounting for both local (e.g., for the individual channels 400A-C) and global (e.g., across multiple channels 400A-C) features. Although flow 500 includes only three channels 400A-C, this disclosure should not be read as limited to three channels, and should be read as including any number of parallel channels.

An output of the model trained according to flows 400 and/or 500 may be utilized for various purposes, including a profile/background check, assignment of a "dynamic" credit score for deferred transaction services (given that such a transaction typically does not involve a buyer's credit), account payment history, or other application check.

The functional modules 113 may include an account takeover module 116 configured to determine if a legitimate user's credentials are being used by a fraudulent actor. While credential stuffing relies on "brute force" to gain entry, an account takeover attack relies on unauthorized access of a genuine account using genuine credentials taken from the genuine user. Although different types of attack, the account takeover module 116 may utilize similar data as the credential stuffing module 114 in order to compare the user's pattern of activity with an expected pattern of activity. However, rather than comparing the pattern of behavior to a standard pattern (like the credential stuffing module 114), the account takeover module 116 may instead generate an expected pattern of behavior that may be bespoke to the user at-question. By then comparing the actual pattern of behavior to what would be expected of this particular user, the account takeover module 116 may determine whether the user is the genuine user or a bad actor who stole the user's credentials. The account takeover module 116 may be included in the first set 113*a* of modules.

The functional modules 113 may include a trojan threat module 117 configured to determine if a received request includes malicious content (e.g., a virus) that could damage the transaction strategy system 110 if approved. The trojan threat module 117 may collect meta-data contained by the request, evaluate the meta-data in order to identify (and rank) potential threats. By combining this analysis with behavioral patterns identified (e.g., by the credential stuffing module 114) in the user data, the trojan threat module 117 may further escalate the calculation of risk from the meta-data. The trojan threat module 117 may be included in the first set 113*a* of modules.

The functional modules 113 may include a triangulation module 118 configured to determine whether an offering from the merchant server 130 is legitimate. In particular, the triangulation module 118 may determine whether the products and/or services that are the subject of the underlying transaction associated with the deferred transaction service are legitimate, and if the merchant associated with the merchant server 130 is fraudulent. By leveraging publicly-available data (e.g., from social media, from business forums, etc.) with data from the user device 120 and historical data stored from the data source 140, the triangulation module 118 may "triangulate" these three datasets to determine a legitimacy of one or both of the merchant or the buyer. The triangulation module 118 may be included in the second set 113*b* of modules.

Figure 6:
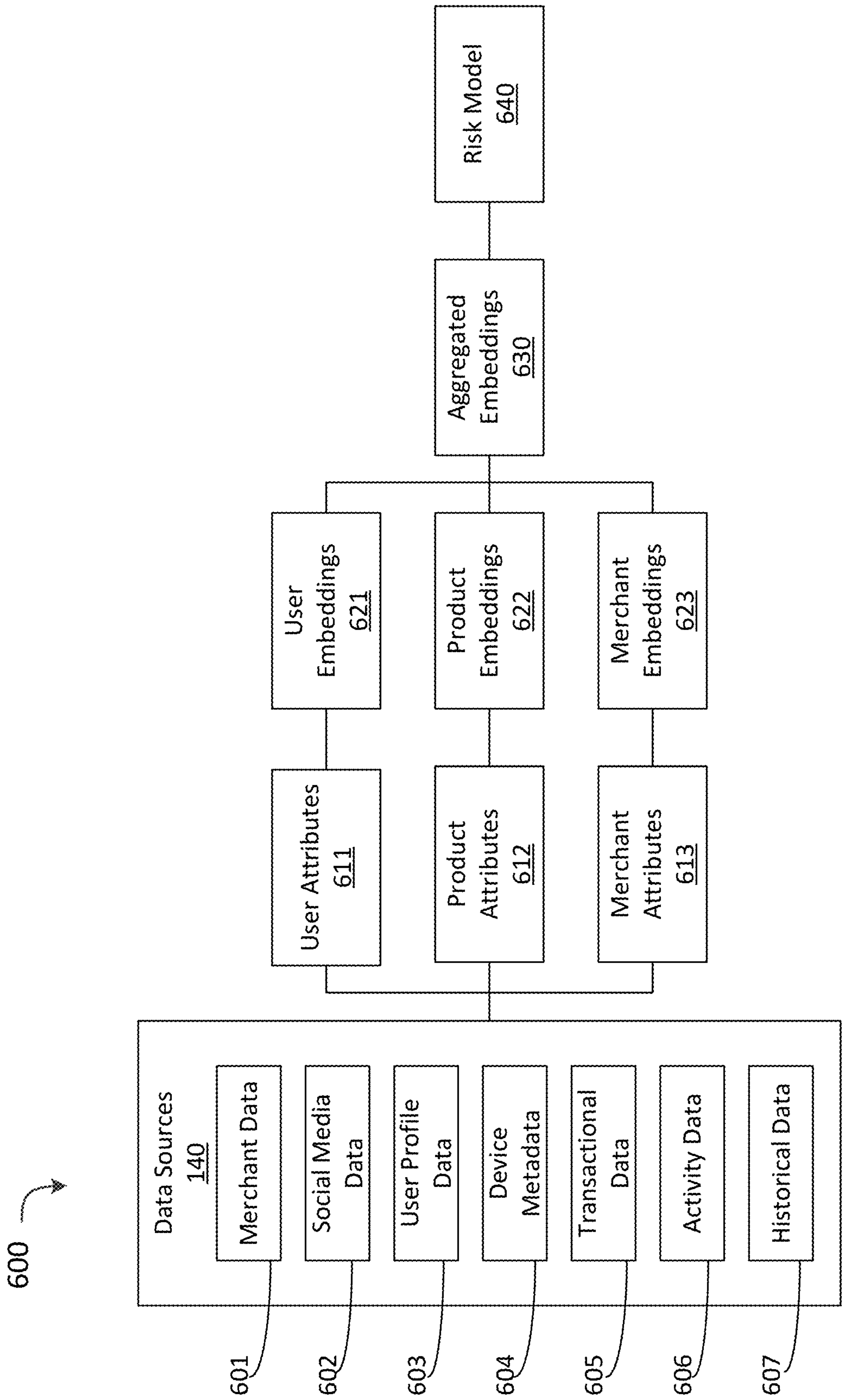
FIG. 6 is a block diagram of a module of the example system of FIG. 1.

FIG. 6 is a block diagram of an example flow 600 for the triangulation module 118. As shown in FIG. 6, the triangulation module 118 may leverage the data sources 140 to extract three sets of attributes (e.g., user attributes 611, product attributes 612, and merchant attributes 613) for a given transaction, may generate embeddings sets representative of each set of attributes, and may combine (e.g., aggregate) the embeddings sets into a single embeddings representative of the transaction, which may be used to train a model.

The data sources 140 may include merchant data 601, social media data 602, user profile data 603, device metadata 604, transactional data 605, activity data 606, and historical data 607. Each of the merchant data 601 and the social media data 602 may be retrieved from publicly-available databases via the internet, and may be indicative of a reputation and/or public perception of the merchant at-issue in the request. The social media data 602 may include patterns and connections between users, which may be leveraged to identify patterns of fraud. The user profile data 603 may be received from one or more of the user device 120 or the merchant server 130, as the user profile data 603 may include personal data on a user (which would be stored on the user device 120) and data particular to the user's account with the respective merchant (which would be stored on the merchant server 130). Similarly, the transactional data 605 (which may be indicative of the respective user's previous transactions, either with or without the same merchant) and the historical data 607 (which may be indicative of larger trends) may be received from one or both of the user device 120 and the merchant server 130. Finally, the activity data 606 (which may be indicative of physical activity of the user device 120) may be received from the user device 120, and may be considered analogous to device movement data 322 from FIG. 3.

Based on the data sources 140, the triangulation module 118 may derive attributes for a given transaction from the data sources 140 and may organize the derived attributes according to categories of the attributes. As shown, these categories of attributes may include user attributes 611 (e.g., for a buyer of the transaction), product attributes 612 (e.g., for a subject product and/or service of the transaction), and merchant attributes 613 (e.g., for a seller of the transaction). Once organized, the triangulation module 118 may generate embeddings corresponding to each category of attributes: namely, the triangulation module 118 may generate user embeddings 621 representative of the user attributes 611, product embeddings 622 representative of the product attributes 612, and merchant embeddings 623 representative of the merchant attributes 613. From there, the triangulation module 118 may aggregate (e.g., combine, concatenate) the embeddings 621-623 to generate an aggregated embeddings 630. Accordingly, the aggregated embeddings 630 may be representative of the transaction as a whole.

The flow 600 may be repeated for a plurality of transactions, such that the triangulation module 118 may generate a plurality of aggregated embeddings for training the risk model 640. Once trained, the risk model 640 may receive, as input, transaction details as part of a transaction associated with a deferred transaction service and may generate, as output, a risk score indicative of a likelihood that one of the parties or the subject product and/or service of the transaction is fraudulent.

The functional modules 113 may include a chargeback fraud module 119 configured to derive any intent by the user to commit chargeback fraud as part of the request. Often, a buyer pays for products and/or services-including the repayments associated with a deferred transaction service, such as, for example, a short-term lending transaction—with a credit card, which enables the user to further delay actual payment for products and/or services by using an extension of credit (from the credit card company) to repay the initial extension of credit from the deferred transaction service. As a matter of course, credit cards enable "chargebacks" in which a credit card holder disputes a charge on the card as allegedly fraudulent or incorrect, and the merchant is forced to prove to validity of the charge or else the credit card company removes the charge from the record and the merchant is not paid. While an important function for a system that otherwise has few safeguards for a stolen card, the chargeback function exposes merchants to risk of abuse, where credit card holders request chargebacks on legitimate charges in order to defraud merchants. Deferred transaction services are particularly vulnerable to such frauds, as the products and/or services are provided to the buyer long before the corresponding payment is processed. Accordingly, if a buyer requests a chargeback, they have already received (and likely consumed) the product and/or service at-issue, which leaves little recourse for the merchant. The chargeback fraud module 119 may be included in the second set 113*b* of modules.

In some embodiments, the chargeback fraud module 119 may utilize a blockchain-based chargeback fraud data-sharing mechanism in order to provide a practical and feasible solution for transparent, anti-tamper, and unified fraud data sharing. In general, whenever a chargeback is initiated, details regarding the chargeback (including the requesting buyer, the amount, the merchant, and the product and/or service at-issue) may be recorded as a block on the blockchain. As part of recording the chargeback, the chargeback fraud module 119 may process the data in order to remove duplicate data and to package the data for future reference. Once recorded, the blockchain may serve as a reference "lookup table" for merchants to search for repeated instances of chargeback. For example, if a buyer requests a chargeback from a merchant, the merchant can search the ledger to see if the buyer has a history of chargebacks.

Figure 2:
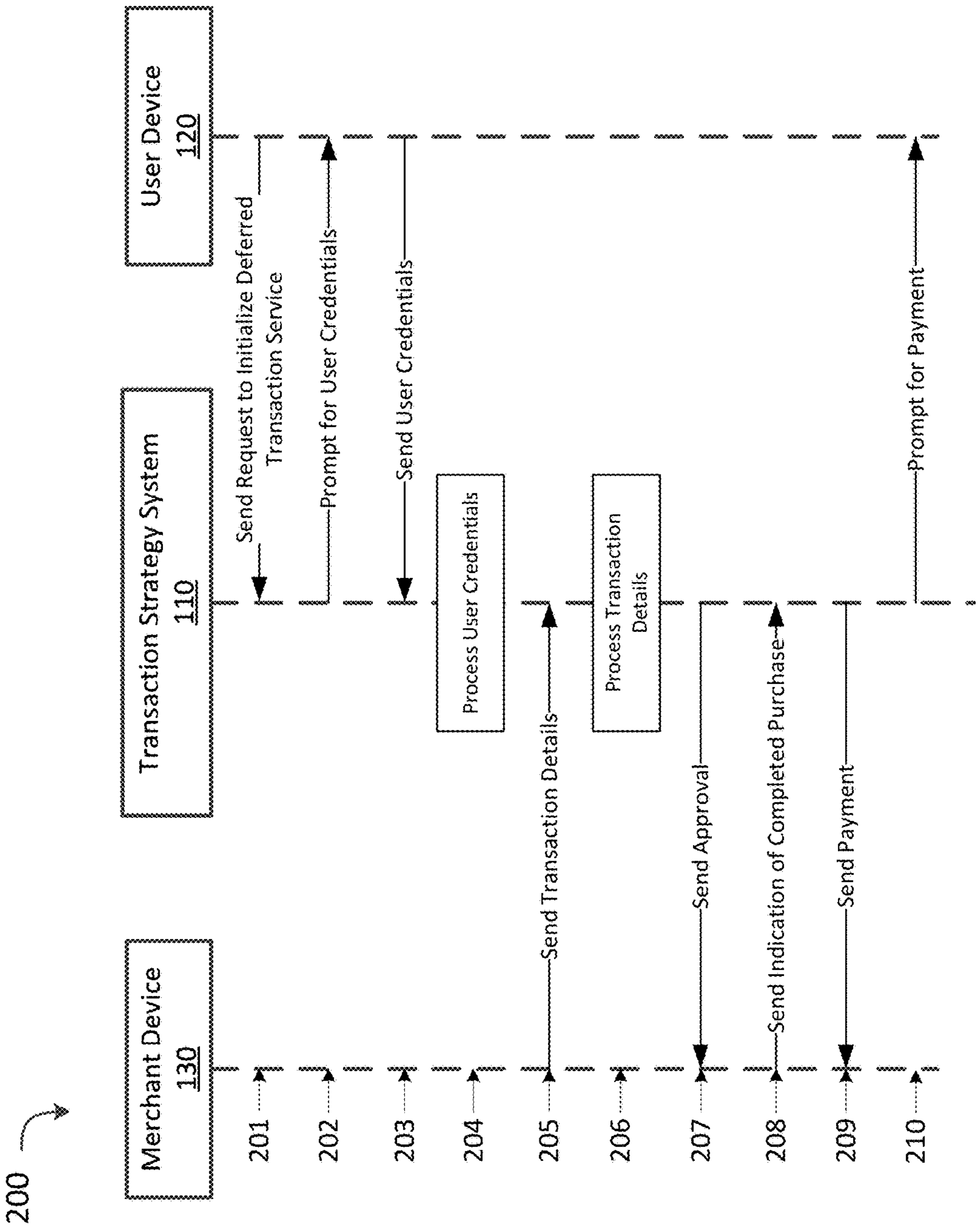
FIG. 2 is a sequence diagram of an example workflow of the example system of FIG. 1.

FIG. 2 is a sequence diagram illustrating an example workflow 200 of the system 100 of FIG. 1. As shown, the workflow 200 may begin at operation 201 with the user device 120 sending a request to the transaction strategy system 110 to initialize a deferred transaction service offered through the transaction strategy system 110. In one example, the deferred transaction service may be a BNPL service for a product or service that the user is interested in purchasing. This request may be performed prior to or in concert with the user device 120 attempting to purchase a product and/or service.

In some embodiments, the request for the deferred transaction service may be sent by the merchant server 130 to the transaction strategy system 110 on behalf of the user during a checkout process with the merchant. For example, at checkout, a user shopping on a website or application of a merchant or seller associated with merchant device 130 may be presented with an option to pay using a deferred transaction service provided by the transaction strategy system 110. The user may select a button to pay for the transaction using the deferred transaction service presented during checkout, which may cause the merchant server 130 to transmit, on behalf of the user, a request to initialize the deferred transaction service to the transaction strategy system 110. In one example, the user may be presented with and select a button, such as, for example, a PayPal® Checkout button or a PayPal® Pay Later button.

At operation 202, the transaction strategy system 110 may respond to the request with a prompt for user credentials. In one embodiment, user credentials may be an email address, username, or login information for a user account associated with the transaction strategy system 110. The user device 120 may respond with user credentials at operation 203. In embodiments where the transaction strategy system 110 receives the request for the deferred transaction service from the merchant server 130 at operation 201, the transaction strategy system 110 at operation 202 may cause the merchant device 130 to or instruct the merchant device 130 to display the prompt for user credentials to the user. In these embodiments, the user may enter their user credentials while remaining at the merchant website or merchant application, and at operation 203, the merchant server 130 may communicate the user credentials to the transaction strategy system 110. For example, the user may enter user credentials via the merchant website or merchant application associated with merchant server 130. The user credentials may identify an account that a user associated with the user device 120 may have previously established with the transaction strategy system 110.

At operation 204, the transaction strategy system 110 may process (e.g., review) the user credentials via one or more modules 113 to validate the user. In particular, the transaction strategy system 110 may process the user credentials with one or more of the first set of modules 113*a*. For example, the transaction strategy system 110 may apply the credential stuffing module 114 to determine whether the user credentials are part of a larger pattern of "credential stuffing" by the user, and/or may apply the synthetic identity theft module 115 to determine if any portion of the user credentials are fabricated or synthetic. In some embodiments, processing the user credentials at operation 204 may involve the transaction strategy system 110 or modules 113*a* of the transaction strategy system 110 communicating with the user device 120 or merchant server 130 to request and receive information needed for one or more of the first set of modules 113*a*.

At operation 205, the transaction strategy system 110 may receive transaction details from the merchant device 130. For example, the receipt of transaction details by the transaction strategy system 110 may be in response to a query issued by the transaction strategy system 110 to the merchant device 130 that, in turn, may be made by the transaction strategy system 110 in response to the first set of modules 113*a* approving (e.g., validating, authenticating, passing, checking, etc.) the user credentials. The query to the merchant device 130 may include identifying information regarding the user device 120, which the merchant device 130 may review in order to respond to the query with associated transaction details. These details may include an identification of a product at-issue, a price of the product, and an identity of the merchant responsible for the merchant device 130.

At operation 206, the transaction strategy system 110 may process (e.g., review) the received transaction details to validate the user. In particular, the transaction strategy system 110 may apply one or more of the second set of modules 113*b* to the transaction details. For example, the transaction strategy system 110 may apply the triangulation module 118 to determine whether the merchant associated with the merchant device 130 and the products and/or services at-issue in the transaction are fraudulent, and may apply the chargeback fraud module 119 to evaluate a likelihood of the user associated with the user device 120 committing chargeback fraud as part of the transaction. In certain embodiments, processing the transaction details at operation 206 may involve the transaction strategy system 110 or modules 113*b* of the transaction strategy system 110 communicating with the user device 120 or the merchant server 130 to request and receive information needed for one or more of the first set of modules 113*b*.

At operation 207, the transaction strategy system 110 may transmit approval for the deferred transaction service to the merchant device 130. The transaction strategy system 110 may transmit this approval in response to the second set of modules 113*b* approving (e.g., validating, authenticating, passing, checking, etc.) the transaction details at operation 206. The approval communicated to the merchant server 130 may signal to the merchant server 130 that the total amount due for the item(s) or service(s) being purchased by the user, will be paid by the transaction strategy system 110 on behalf of the user in accordance with the approved deferred transaction service.

At operation 208, the merchant device 130 may send, to the transaction strategy system 110, an indication that the purchase of the product and/or service at-issue has successfully been completed. The transaction strategy system 110 may send, at operation 209, payment to the merchant device 130 and, at operation 210, prompt the user device 120 for payment in accordance with the repayment plan agreed upon by the user. In some embodiments, the payment sent by the transaction strategy system 110 at operation 209 may include the entire cost of the product and/or service. As described above, the prompt at operation 210 may be made according to the agreed-upon terms for the deferred transaction service. In certain embodiments, operation 210 may be performed by the transaction strategy system 110 prior to operation 209, such that the transaction strategy system 110 first prompts the user device for payment according to the agreed-upon terms, and then pays the merchant device 130 using the funds received from the user device 120. In these embodiments, the transaction strategy system 110 acts as a facilitator for the transaction, rather than as a creditor/debitor.

Figure 7:
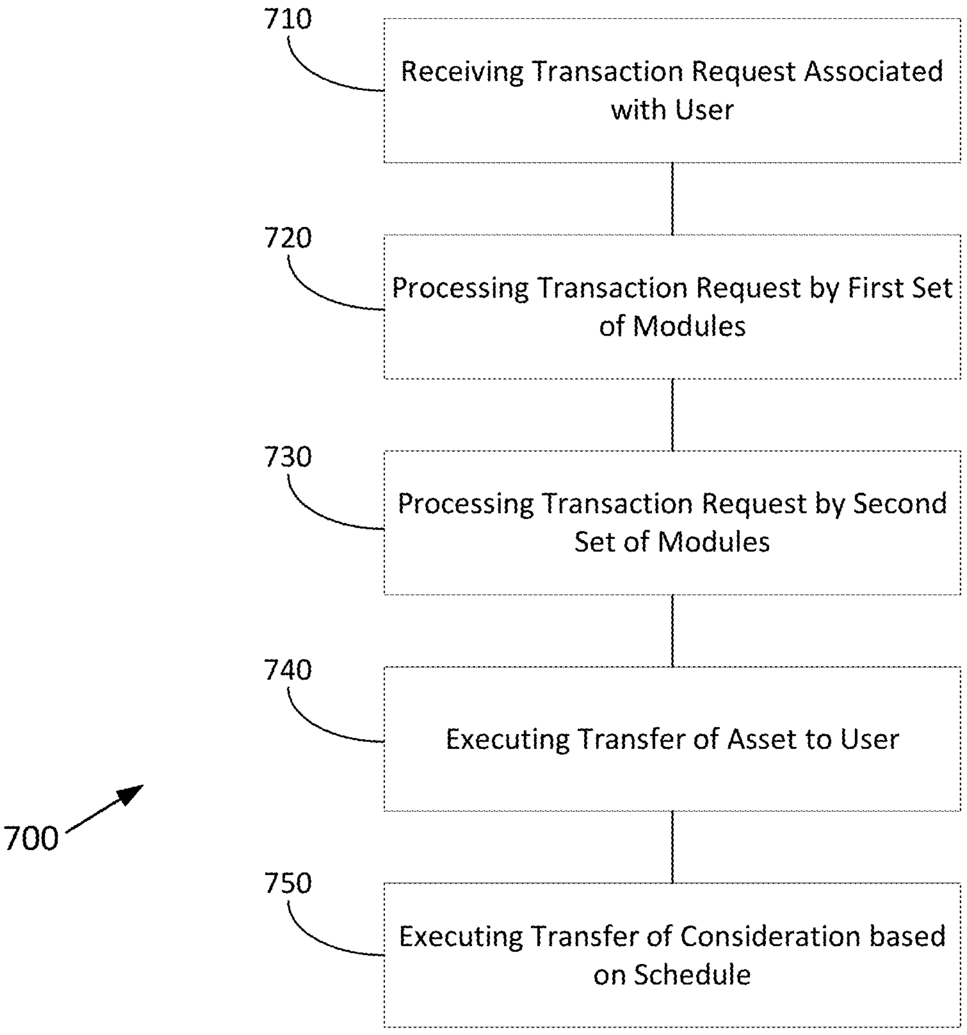
FIG. 7 is a flow chart illustrating an example method of processing a transaction.

FIG. 7 is a flow chart illustrating an example method 700 of processing a request for a deferred transaction service. The method 700, or one or more portions of the method 700, may be performed by system 100 and particularly the transaction strategy system 110 (shown in FIG. 1), in some embodiments.

The method 700 may include, at block 710, receiving a transaction request associated with a user. In some embodiments, the transaction request may be a request to utilize the deferred transaction service. The transaction request may be received from the user device 120, and may include identifying information about the associated user, as well as device data (and/or metadata) from the user device 120. In some embodiments, the transaction request may be a request to access the transaction strategy system 110, which may be a pre-requisite for initiating a request for a deferred transaction service. In some embodiments, the transaction request may be received from the merchant server 130 during a checkout process, as described above with respect to FIG. 2, via one or more API calls or a software development kit (SDK) provided by the transaction management system 110 to the merchant server 130. For example, the SDK may include software, data and/or code packages, coded instructions, scripts, and/or other data that may be used to configure operations executed by the merchant device 130 during the checkout process.

The method 700 may also include, at block 720, processing the received transaction request with a first set of modules (e.g., first set 113*a*). For example, the transaction strategy system 110 may review content of the transaction request with one or more of the credential stuffing module 114, the synthetic identity theft module 115, the account takeover module 116, or the trojan threat module 117. Generally speaking, the purpose of block 720 may be to confirm a validity of the request based on an identity of the user (e.g., the user making the request is valid) or on another characteristic of the request (e.g., the request is not merely a vehicle for a computer virus). Accordingly, the portion of the transaction request reviewed at block 720 may be the portion configured to serve as an access request to the transaction strategy system 110, rather than as request for the deferred transaction service itself.

The method 700 may further include, at block 730, processing the received transaction request with a second set of modules (e.g., second set 113*b*). Block 730 may be performed only in response to the review at block 720 approving the request, such that the analysis at block 730 may not be performed unless the user associated with the request is granted access to the transaction strategy system 110. At block 730, the transaction strategy system 110 may review content of the transaction request with one or more of the triangulation module 118 or the chargeback fraud module 119. Generally speaking, the purpose of block 730 may be to approve the details of the underlying transaction based on characteristics of either party (e.g., is the buyer attempting fraud? Is the merchant legitimate?) or of the product and/or service at-issue (e.g., is the asset being purchased real?). Accordingly, the portion of the transaction request reviewed at block 730 may be the portion that includes transaction details rather than information on the user themselves.

The method 700 may also include, at block 740, executing transfer of the asset at-issue in the transaction from the merchant to the buyer. In some embodiments, this execution may include the transaction strategy system 110 notifying the merchant that the user has been approved (e.g., at block 730) for the requested deferred transaction service, and instructing the merchant to send the asset (e.g., ship the product).

The method 700 may further include, at block 750, executing transfer of consideration for the asset from the user (e.g., buyer) to the service provider associated with the transaction strategy system 110 according to the schedule agreed upon by the user and the service provider in accordance with the conditions and agreements of the deferred transaction service. As described above with reference to operations 209 and 210 of the workflow 200, the transaction strategy system 110 may function as an intermediary for the consideration-receiving it from the buyer and then passing through to the merchant—or the transaction strategy system 110 may "float" the consideration, thereby transferring it to the merchant immediately and then collecting scheduled payments from the user. "Consideration" here may refer to an amount of money or other value provided by the buyer in exchange for the product and/or service provided by the merchant. "Floating" in a transaction such as this refers to an intermediary (e.g., the transaction strategy system 110) holding onto funds involved in a transaction for a period before fully transferring-much like how a ticket resale system holds the received funds from a buyer for a period before transferring the funds to the seller.

Figure 8:
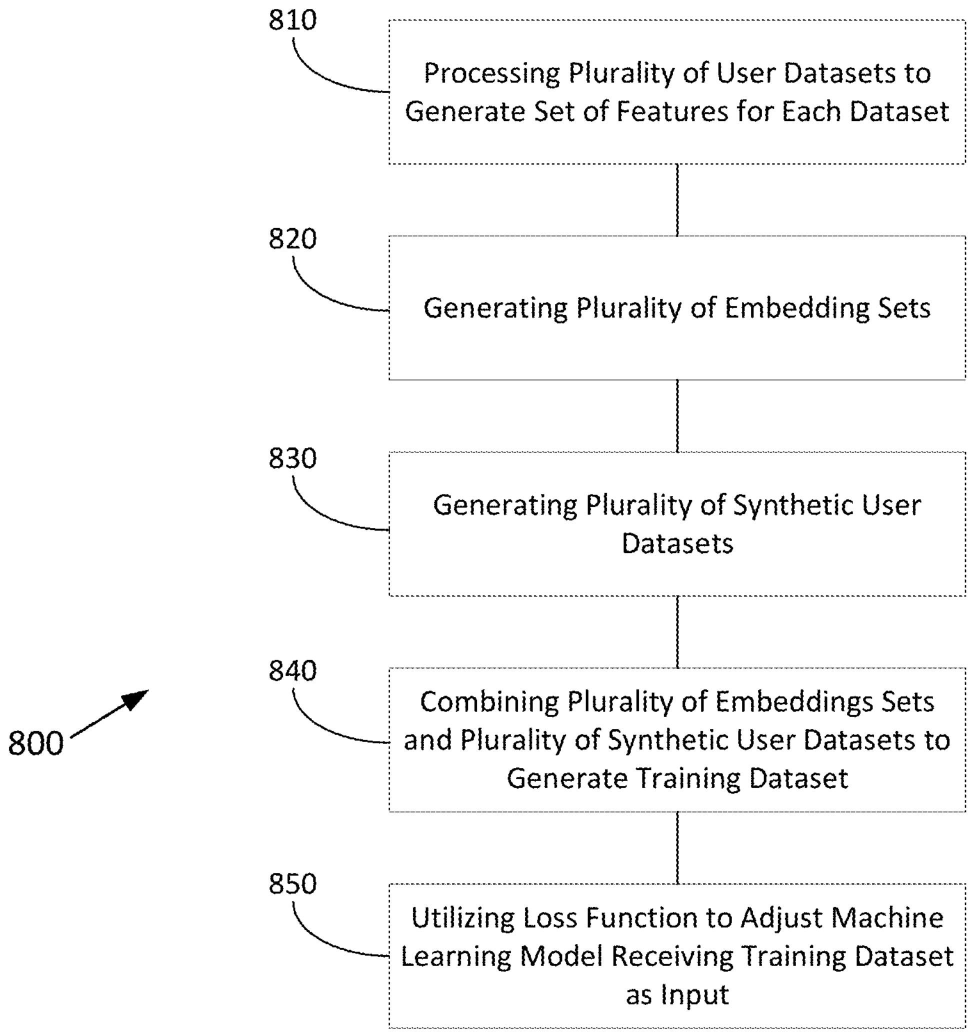
FIG. 8 is a flow chart illustrating an example method of processing a transaction.

FIG. 8 is a flow chart illustrating an example method 800 of training a machine learning model to identify synthetic identity theft. The method 800, or one or more portions of the method 800, may be performed by the transaction strategy system 110 and, in particular, the synthetic identify theft module 118 (shown in FIG. 1), in some embodiments.

The method 800 may include, at block 810, processing a plurality of user datasets to generate a set of features for each dataset. In particular, the transaction strategy system 110 may extract and organize features into categories, such that features shared by multiple users (and reflected in corresponding user datasets) may be clustered together. From there, the method 800 may also include, at block 820, generating a plurality of embeddings sets that each represent a set of features. Accordingly, the transaction strategy system 110 may, overall, transform user data into plotted embeddings that represent features shared across the user population.

The method 800 may further include, at block 830, generating a plurality of synthetic user datasets based on the initial plurality of user datasets. The transaction strategy system 110 may generate these in parallel with the embeddings at block 820. As described above with reference to the flow 400, the transaction strategy system 110 may generate synthetic user datasets by supplementing existing user data (e.g., the initial plurality of user datasets) with noise.

The method 800 may also include, at block 840, combining the embeddings sets from block 820 and the synthetic user datasets from block 830 to generate a training dataset. Accordingly, the training set may include two types of synthetic profiles: fully-synthetic data generated based on extracted features (e.g., the embeddings from 820) and partially-synthetic data that include real user data (e.g., the synthetic user datasets from 830).

The method 800 may further include, at block 850, utilizing a loss function to adjust a machine learning model based on the training dataset. The machine learning model may be a discriminator configured to receive a user profile and to generate a score indicative of an amount of synthetic information stored within the received profile.

Figure 9:
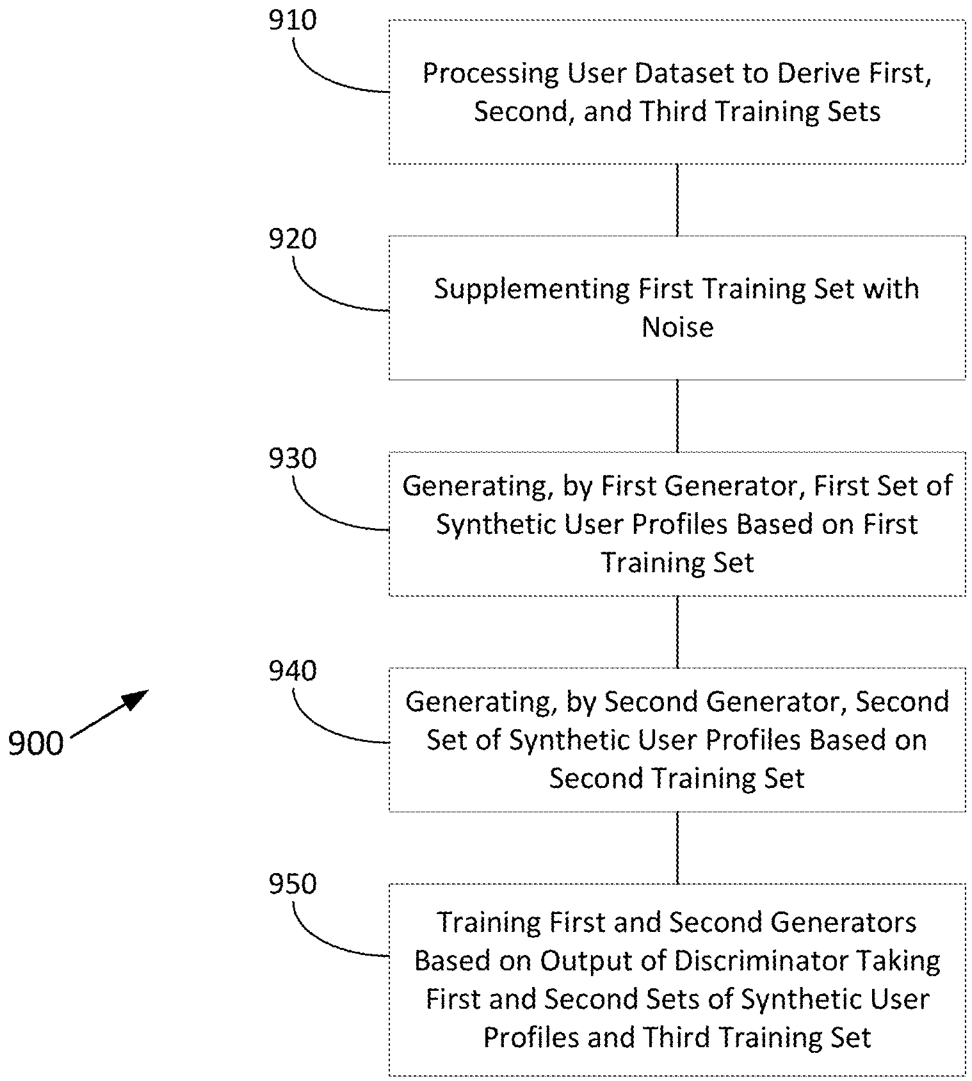
FIG. 9 is a flow chart illustrating an example method of processing a transaction.

FIG. 9 is a flow chart illustrating an example method 900 of training a machine learning model to identify synthetic identity theft. The method 900, or one or more portions of the method 900, may be performed by the transaction strategy system 110 and, in particular, the synthetic identify theft module 118 (shown in FIG. 1), in some embodiments.

The method 900 may include, at block 910, processing a user dataset to derive first, second, and third training sets. In some embodiments, these three training sets may be substantially identical at this block. Particularly in those embodiments utilizing the multi-channel approach of flow 500, the three training sets may focus on a particular category or group of user characteristics (e.g., temporal, spatial, semantic, syntactic, etc.).

The method 900 may also include, at block 920, supplementing the first training set with noise. As described above with reference to the synthetic embeddings 405 of the flow 400, adding noise to a "real" dataset may generate a set of user profiles containing a mix of real and fabricated data.

The method 900 may further include, at block 930, generating, by a first generator, a first set of synthetic user profiles based on the first training set. As described above with reference to the synthetic profile 407 of the flow 400, this first set of synthetic user profiles may be generated by a generator (e.g., synthetic generator 406) that leverages the partially-synthetic profiles from block 920 to create additional profiles that share a similar mix of real and fake data.

The method 900 may further include, at block 940, generating, by a second generator, a second set of synthetic user profiles based on the second training set. As described above with regard to the feature profile 410 of the flow 400, this second set of synthetic user profiles may be generated by a generator (e.g., feature generator 409) that leverage extracted features from actual user data to create fully-synthetic user profiles that attempt to replicate actual user features.

The method 900 may further include, at block 950, training each of the first and second generators based on output of a discriminator receiving, as input, the first and second sets of synthetic user profiles and the third training set. In particular, this discriminator may be configured to determine an extent to which a received user profile includes synthetic data. By training the discriminator with these three different sets of user profiles—each containing a different proportion of synthetic data—the discriminator may be more completely trained. From there, the output of the discriminator may be also used to train the generators employed by blocks 930 and 940, such that the synthetic profiles generated at each stage may similarly be improved in order to present a more realistic (and objectively more difficult) training set for the generator. This multi-model training method is referred to as "adversarial training."

Figure 10:
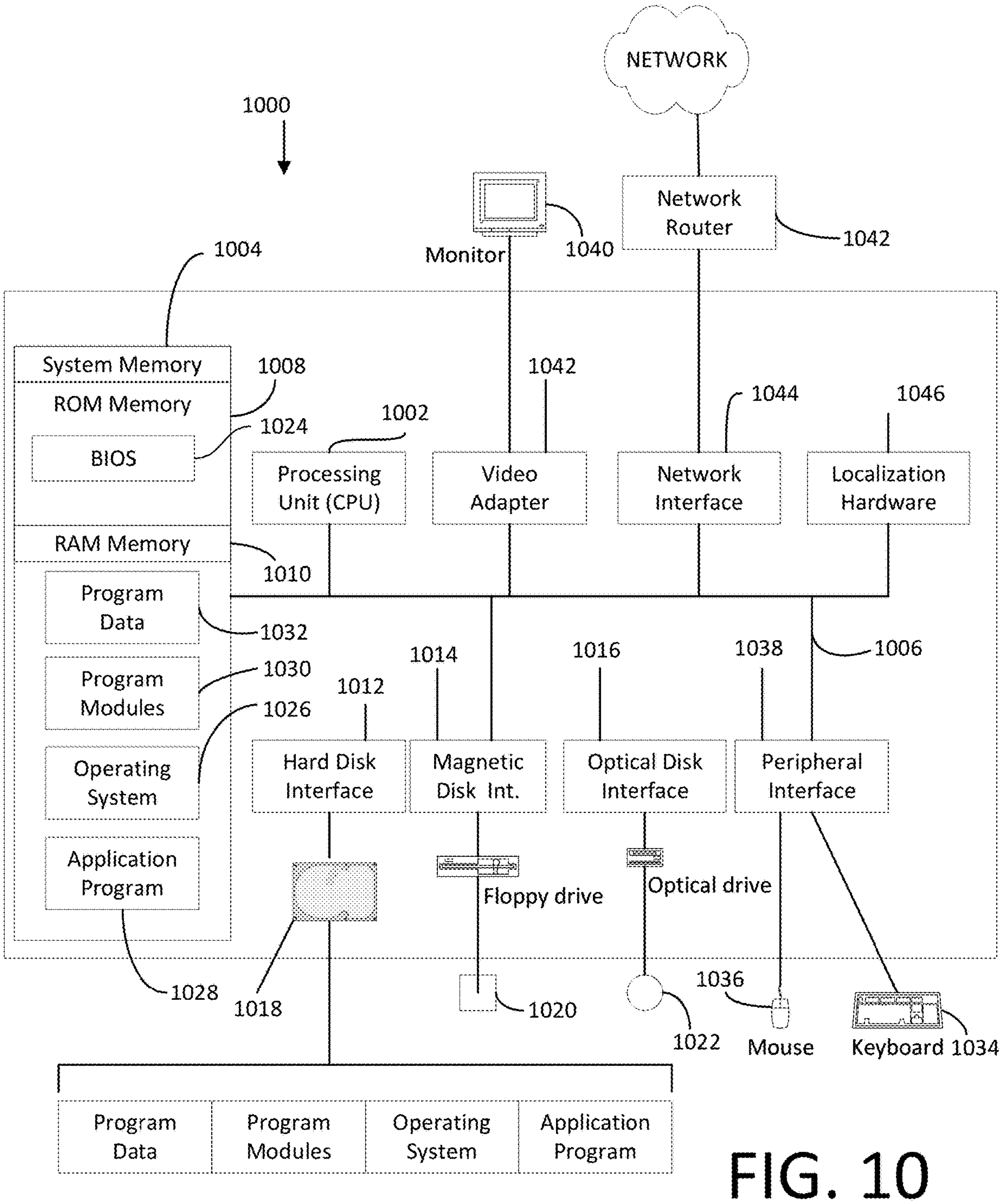
FIG. 10 is a diagrammatic view of an example embodiment of a user computing environment.

FIG. 10 is a diagrammatic view of an example embodiment of a user computing environment that includes a computing system environment 1000, such as a desktop computer, laptop, smartphone, tablet, or any other such device having the ability to execute instructions, such as those stored within a non-transient, computer-readable medium. For example, the computing system environment 1000 may be the user device 120 or a system hosting the transaction strategy system 110. In another example, one or more components of the computing system environment 1000, such as one or more CPUs 1002, RAM memory 1010, network interface 1044, and one or more hard disks 1018 or other storage devices, such as SSD or other FLASH storage, may be included in the transaction strategy system 110. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 1000 typically includes at least one processing unit 1002 (e.g., processor 162) and at least one memory 1004 (e.g., memory 164), which may be linked via a bus. Depending on the exact configuration and type of computing system environment, memory 1004 may be volatile (such as RAM 1010), non-volatile (such as ROM 1008, flash memory, etc.) or some combination of the two. Computing system environment 1000 may have additional features and/or functionality. For example, computing system environment 1000 may also include additional storage (removable and/or non-removable) including, but not limited to, magnetic or optical disks, tape drives and/or flash drives. Such additional memory devices may be made accessible to the computing system environment 1000 by means of, for example, a hard disk drive interface 1012, a magnetic disk drive interface 1014, and/or an optical disk drive interface 1016. As will be understood, these devices, which would be linked to the system bus, respectively, allow for reading from and writing to a hard disk 1018, reading from or writing to a removable magnetic disk 1020, and/or for reading from or writing to a removable optical disk 1022, such as a CD/DVD ROM or other optical media. The drive interfaces and their associated computer-readable media allow for the nonvolatile storage of computer readable instructions, data structures, program modules and other data for the computing system environment 1000. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1000.

A number of program modules may be stored in one or more of the memory/media devices. For example, a basic input/output system (BIOS) 1024, containing the basic routines that help to transfer information between elements within the computing system environment 1000, such as during start-up, may be stored in ROM 1008. Similarly, RAM 1010, hard disk 1018, and/or peripheral memory devices may be used to store computer executable instructions comprising an operating system 1026, one or more applications programs 1028 (which may include the functionality of the transaction strategy system 110 of FIG. 1 or one or more of its functional modules 114, 116, and 118, for example), other program modules 1030, and/or program data 1032. Still further, computer-executable instructions may be downloaded to the computing environment 1000 as needed, for example, via a network connection.

An end-user may enter commands and information into the computing system environment 1000 through input devices such as a keyboard 1034 and/or a pointing device 1036. While not illustrated, other input devices may include a microphone, a joystick, a game pad, a scanner, etc. These and other input devices would typically be connected to the processing unit 1002 by means of a peripheral interface 1038 which, in turn, would be coupled to bus. Input devices may be directly or indirectly connected to processor 1002 via interfaces such as, for example, a parallel port, game port, firewire, or a universal serial bus (USB). To view information from the computing system environment 1000, a monitor 1040 or other type of display device may also be connected to bus via an interface, such as via video adapter 1042. In addition to the monitor 1040, the computing system environment 1000 may also include other peripheral output devices, not shown, such as speakers and printers.

The computing system environment 1000 may also utilize logical connections to one or more computing system environments. Communications between the computing system environment 1000 and the remote computing system environment may be exchanged via a further processing device, such a network router 1042, that is responsible for network routing. Communications with the network router 1042 may be performed via a network interface component 1044. Thus, within such a networked environment, e.g., the Internet, World Wide Web, LAN, or other like type of wired or wireless network, it will be appreciated that program modules depicted relative to the computing system environment 1000, or portions thereof, may be stored in the memory storage device(s) of the computing system environment 1000.

The computing system environment 1000 may also include localization hardware 1046 for determining a location of the computing system environment 1000. In embodiments, the localization hardware 1046 may include, for example only, a GPS antenna, an RFID chip or reader, a WiFi antenna, or other computing hardware that may be used to capture or transmit signals that may be used to determine the location of the computing system environment 1000.

In some embodiments, a system may include a processor; and a non-transitory computer readable medium stored thereon instructions that are executable by the processor to cause the system to perform operations that may include receiving, via an interface respective of a third party, a first request respective of a user to access a payment application; prompting the user, in response to the first request, to provide user credentials; receiving, from the user, user credentials; processing, via a first set of modules, the user credentials to determine a validity of the user credentials; in response to determining that the user credentials are valid, retrieving transaction details from the third party, the transaction details may include a profile of the third party and a profile of a subject of the transaction; processing, via a second set of modules, the transaction details to determine a validity of the transaction details; and in response to determining that the transaction details are valid, transmitting an approval of the user to the third party.

In some of these embodiments, the operations may further include receiving, from the third party, an indication that the subject of the transaction has been transferred to the user; in response to the indication, executing a first transfer of funds to the third party, the first amount based on the transaction details; and prompting the user for a second transfer of funds according to the transaction details.

In some of these embodiments, the first set of modules may include a credential stuffing module; a synthetic identity theft module; an account takeover module; and a trojan threat module.

In some of these embodiments, processing the first request may include determining, by the synthetic identity theft module, that the user credentials are associated with a real user; and in response to the determination, determining that the first request is valid.

In some of these embodiments, the synthetic identity theft module may include a machine learning model training via adversarial learning.

In some of these embodiments, processing the first request may include accessing an activity history of the user; deriving, by the account takeover module, a pattern of activity based on the activity history; reviewing a session history of the user, the session history may include actions taken by the user immediately prior to placing the first request; comparing the derived pattern of activity to the session history; and in response to the derived pattern matching the session history, determining that the first request is valid.

In some of these embodiments, processing the first request may include collecting metadata from the first request; receiving an activity history of the user; processing, by the trojan threat module, the metadata and the activity history to generate a set of request features; and determining, by a classifier of the trojan threat module that receives the set of request features as input, that the first request is associated with a benign user.

In some of these embodiments, the second set of modules may include a triangulation module; and a chargeback fraud module.

In some of these embodiments, processing the second request may include scraping, from at least one third-party source, public profile data; assembling, by the triangulation module, a user profile for the user based on the public profile data; generating, by the triangulation module, a set of embeddings that may include a merchant embeddings respective of the merchant profile; a product embeddings respective of the product profile; and a user embeddings respective of the user profile; aggregating the merchant embeddings, the product embeddings, and the user embeddings to a transaction embeddings; generating, by the triangulation module based on the transaction embeddings as input, a risk score indicative of a validity of the second request; and in response to the risk score being less than a threshold, determining that the transaction details are valid.

In some of these embodiments, the merchant profile may include a category of the merchant; a reputation of the merchant, the reputation derived from one or more public data sources; a location of the merchant; or an IP address of a device associated with the merchant.

In some of these embodiments, the product profile may include a category of the product; a cost of the product; or a quantity of the product.

In some of these embodiments, processing the second request may include retrieving a stored list of chargeback fraud events; analyzing, by the chargeback fraud module, the stored list to derive a set of behaviors associated with chargeback fraud; retrieving, from a user device associated with the first request, an activity history of the user; deriving, by the chargeback fraud module, a pattern of behavior based on the activity history; determining a risk score based on a comparison of the derived pattern of behavior of the user to the derived set of behaviors; and in response to the risk score being less than a threshold value, determining that the transaction details are valid.

In some of these embodiments, the stored list is stored on one or more nodes of a distributed ledger.

In some embodiments, a method may include receiving an asset transfer request from a user. The asset transfer request may include an asset; an amount of consideration; and a schedule for conveying the consideration for the asset. The method may further include processing the asset transfer request by a first set of modules; in response to the first set of modules approving the asset transfer request, processing the asset transfer request by a second set of modules; in response to the second set of module approving the asset transfer request, executing a transfer of the asset to the user; and in response to the transfer of the asset, executing a transfer of the amount of consideration based on the schedule.

In some of these embodiments, the first set of modules may include a credential stuffing module configured to determine whether the user is authorized for the asset transfer request; a synthetic identity theft module configured to determine whether the user is genuine; an account takeover module configured to determine whether the asset transfer request is received from a malicious actor; and a trojan threat module configured to determine whether the asset transfer request may include a malicious component.

In some of these embodiments, the second set of modules may include a triangulation module configured to determine a validity of a third party offering the asset; and a chargeback fraud module to determine a risk that the user commits chargeback fraud subsequent to the asset transfer.

In some of these embodiments, the schedule may include a first portion of the consideration and a second portion of the consideration; the first portion is transferred immediately subsequent to the asset transfer; and the second portion is transferred after a period of time subsequent to the asset transfer.

In some of these embodiments, the method may further include processing, by the second set of modules, the second portion of the consideration immediately prior to the transfer of the second portion.

In some embodiments, a system may include a processor; and a non-transitory computer readable medium stored thereon instructions that are executable by the processor to cause the system to perform operations that may include receiving a request to transfer an asset to a first party from a second party at a first time and to transfer consideration from the first party to the second party at a second time, the first time different than the second time; at the first time, processing the request via at least one module of a plurality of modules; in response to the at least one module approving the request, transferring the asset to the first party; at the second time, re-processing the request via at least one module of the plurality of modules; and in response to the at least one module approving the request, transferring the consideration to the second party.

In some of these embodiments, the plurality of modules include one or more of a credential stuffing module configured to determine whether the first party is authorized for the request; a synthetic identity theft module configured to determine whether the first party is genuine; an account takeover module configured to determine whether the request is received from a malicious third party; a trojan threat module configured to determine whether the request may include a malicious component; a triangulation module configured to determine whether the second party is genuine; or a chargeback fraud module to determine a risk that the consideration may include chargeback fraud.

In some embodiments, a computer-implemented method for utilizing a machine learning model configured to determine synthetic identity theft may include processing a plurality of user datasets to generate a set of features for each user dataset, each set of features representative of a particular user; generating a plurality of embeddings sets, each embedding set being representative of a respective set of features; generating a plurality of synthetic user datasets; combining the plurality of embeddings sets and the plurality of synthetic user datasets to generate a training dataset, the training dataset may include a plurality of user profiles; training the machine learning model based on the generated training dataset; and determining, via the machine learning model and in response to receiving a new user profile, a determination of whether the new user profile is real or synthetic.

In some of these embodiments, the generating the plurality of synthetic user datasets utilizes an adversarial network trained using the plurality of user datasets.

In some of these embodiments, the set of features may include a set of first features corresponding to a first category of user features, and the method may further include processing the plurality of user data sets to generate a set of second features for each user dataset, the second features corresponding a second category of user features; and generating a second training dataset based on embeddings sets respective of the set of second features.

In some of these embodiments, the first category of user features may include global features and the second category of user features may include local features.

In some of these embodiments, the method may further include receiving, from a user device, an access request, the access request may include a requesting user profile; determining, via the trained machine learning model, a synthetic score respective of the requesting user profile; and selectively granting the access request based on the synthetic score.

In some of these embodiments, the synthetic score is indicative of a likelihood that the requesting user profile may include synthetic data.

In some embodiments, a system may include a processor; and a non-transitory computer readable medium stored thereon instructions that are executable by the processor to cause the system to perform operations that may include processing a user dataset to derive a first training set that may include identity data; a second training set that may include feature data; and a third training set that may include encoded data. The operations may further include supplementing the first training set with noise; generating, by a first generator, a first set of synthetic user profiles based on the first training set; generating, by a second generator, a second set of synthetic user profiles based on the second training set; and training each of the first generator and the second generator based on output from a discriminator that takes, as inputs, the first set of synthetic user profiles, the second set of synthetic user profiles, and the third training set.

In some of these embodiments, the discriminator is configured to receive a user profile and to output a determination of whether the user profile may include a synthetic identity.

In some of these embodiments, the discriminator is trained to identify the first set of synthetic user profiles as fraudulent and to identify the second set of synthetic user profiles as genuine.

In some of these embodiments, the first generator may be trained to cause the discriminator to identify the first set of synthetic user profiles as genuine, and the second generator may be trained to cause the discriminator to identify the second set of synthetic profiles as fraudulent.

In some of these embodiments, the operations may further include receiving, from a user device, an access request, the access request may include a user profile; generating, via the discriminator, an indication of whether the user profile may include a synthetic user profile; and selectively granting the access request based on the generated indication.

In some of these embodiments, the generated indication may include a binary value, with a first value indicative of a genuine determination and a second value indicative of a synthetic determination, and the selectively granting may include granting the access request in response to the generated indication being the first value, and denying the access request in response to the generated indication being the second value.

In some of these embodiments, the generated indication may include a scalar value indicative of a likelihood that the user profile is the synthetic user profile, and the selectively granting may include granting the access request in response to the generated indication being below a threshold value, and denying the access request in response to the generated indication being greater than or equal to the threshold value.

In some embodiments, a system may include a processor; and a non-transitory computer readable medium stored thereon instructions that are executable by the processor to cause the system to perform operations that may include receiving an access request that may include a user profile; and processing, by an adversarial-trained discriminator, the user profile to determine whether the user profile is false. The discriminator may be trained by retrieving a set of true profiles; generating, by a generator, a set of false profiles; outputting, by the discriminator, a determination in response to an input of a profile from either the set of true profiles or the set of false profiles; and adjusting, by a loss function, at least one of the discriminator or the generator based on the output determination. The operations may further include in response to the determination, by the discriminator, that the user profile is false, rejecting the access request.

In some of these embodiments, the input profile is from the set of false profiles, and the adjusting of the at least one of the discriminator or the generator may include in response to the output determination indicating true, positively adjusting the generator; and in response to the output determination false, negatively adjusting the generator.

In some of these embodiments, the input profile is from the set of true profiles, and the adjusting of the at least one of the discriminator or the generator may include in response to the output determination indicating true, positively adjusting the discriminator; and in response to the output determination false, negatively adjusting the discriminator.

In some of these embodiments, the generator may be further trained by supplementing the retrieved set of true profiles with noise to generate a set of training profiles; generating a set of training embeddings respective of the set of training profiles; and training the generator with the set of training embeddings.

In some of these embodiments, the generator may include a local generator and a global generator, the discriminator may include a final discriminator, and the final discriminator may be further trained by processing the retrieved set of true profiles to derive a set of true local features and a set of true global features; generating, by the local generator, a set of false local features; generating, by the global generator, a set of false global features; training a local discriminator with the set of true local features and the set of false local features; outputting, by the local discriminator in response to receiving a profile from either the set of true profiles or the set of false profiles as input, a local determination; training a global discriminator with the set of true global features and the set of false global features; outputting, by the global discriminator in response to receiving a profile from either the set of true profiles or the set of false profiles as input, a global determination; training the final discriminator based on the local determination and the global determination.

In some of these embodiments, the discriminator may be further trained based on local features and global features from the set of true profiles and from the set of false profiles.

In some of these embodiments, the operations may further include, in response to the determination, by the discriminator, that the user profile is true, granting the access request.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for utilizing a machine learning model configured to determine synthetic identity theft, the method comprising:

processing a plurality of user datasets to generate a set of features for each user dataset, each set of features comprising fully-synthetic data representative of user data of a particular user, each set of features having a different structure and organization compared to the user data;

grouping each feature of each set of features into a respective category of a plurality of categories;

generating a plurality of embeddings sets, each embedding set representative of features shared across the plurality of users;

generating a plurality of synthetic user datasets by supplementing user data from the plurality of user datasets with noise data;

combining the plurality of embeddings sets corresponding to fully-synthetic data and the plurality of synthetic user datasets corresponding to partially-synthetic data to generate a training dataset, the training dataset comprising a plurality of user profiles;

training the machine learning model based on the generated training dataset; and determining, via the machine learning model and in response to receiving a new user profile, a determination of whether the new user profile is real or synthetic, wherein the plurality of user profiles comprises synthetic profiles based on extracted features of the plurality of synthetic user datasets and the plurality of embeddings sets.

2. The method of claim 1, wherein the generating the plurality of synthetic user datasets utilizes an adversarial network trained using the plurality of user datasets.

3. The method of claim 1, wherein the set of features comprises a set of first features, the first features corresponding to a first category of user features, and wherein the method further comprises:

processing the plurality of user datasets to generate a set of second features for each user dataset, the second features corresponding a second category of user features; and generating a second training dataset based on embeddings sets respective of the set of second features.

4. The method of claim 3, wherein the first category of user features comprises global features and the second category of user features comprises local features.

5. The method of claim 1, further comprising:

receiving, from a user device, an access request, the access request comprising a requesting user profile;

determining, via the trained machine learning model, a synthetic score respective of the requesting user profile; and selectively granting the access request based on the synthetic score.

6. The method of claim 5, wherein the synthetic score is indicative of a likelihood that the requesting user profile comprises synthetic data.

7. A system comprising:

a processor; and a non-transitory computer readable medium stored thereon instructions that are executable by the processor to cause the system to perform operations comprising:

processing a user dataset to derive:

a first training set comprising identity data;

a second training set comprising feature data; and a third training set comprising encoded data;

supplementing the first training set with noise;

generating, by a first generator, a first set of synthetic user profiles based on the supplemented first training set;

generating, by a second generator, a second set of synthetic user profiles based on the second training set; and training each of the first generator and the second generator based on output from a discriminator that takes, as inputs, the first set of synthetic user profiles, the second set of synthetic user profiles, and the third training set, wherein the first set of synthetic user profiles comprises partially-synthetic profiles based on extracted features from the supplemented first training set, and wherein the second set of synthetic user profiles comprises fully-synthetic user profiles based on extracted features from the second training dataset.

8. The system of claim 7, wherein the discriminator is configured to receive a user profile and to output a determination of whether the user profile comprises a synthetic identity.

9. The system of claim 8, wherein the discriminator is trained to identify the first set of synthetic user profiles as fraudulent and to identify the second set of synthetic user profiles as genuine.

10. The system of claim 8, wherein:

the first generator is trained to cause the discriminator to identify the first set of synthetic user profiles as genuine, and the second generator is trained to cause the discriminator to identify the second set of synthetic profiles as fraudulent.

11. The system of claim 7, wherein the operations further comprise:

receiving, from a user device, an access request, the access request comprising a user profile;

generating, via the discriminator, an indication of whether the user profile comprises a synthetic user profile; and selectively granting the access request based on the generated indication.

12. The system of claim 11, wherein:

the generated indication comprises a binary value, with a first value indicative of a genuine determination and a second value indicative of a synthetic determination, and the selectively granting comprises:

granting the access request in response to the generated indication being the first value, and denying the access request in response to the generated indication being the second value.

13. The system of claim 12, wherein:

the generated indication comprises a scalar value indicative of a likelihood that the user profile is the synthetic user profile, and the selectively granting comprises:

granting the access request in response to the generated indication being below a threshold value, and denying the access request in response to the generated indication being greater than or equal to the threshold value.

14. A system comprising:

a processor; and a non-transitory computer readable medium stored thereon instructions that are executable by the processor to cause the system to perform operations comprising:

receiving an access request, the access request comprising a user profile;

processing, by an adversarial-trained discriminator, the user profile to determine whether the user profile is false, the discriminator trained by:

retrieving a set of true profiles;

generating, by a first generator, a set of false profiles based on the set of true profiles;

generating, by a second generator, a set of partially-false profiles based on supplementing the retrieved set of true profiles with noise;

outputting, by the discriminator, a determination in response to an input of a profile from one of the set of true profiles, the set of partially-false profiles, or the set of false profiles; and adjusting, by a loss function, at least one of the discriminator, the first generator, or the second generator based on the output determination; and in response to the determination, by the discriminator, that the user profile is false, rejecting the access request, wherein the determination, by the discriminator, is based on a plurality of user profiles comprising the set of true profile, the set of false profiles, and the set of partially-false profiles based on extracted features from the set of true profiles.

15. The system of claim 14, wherein the input profile is from the set of false profiles, and wherein the adjusting the at least one of the discriminator or the generator comprises:

in response to the output determination indicating true, positively adjusting the generator; and in response to the output determination false, negatively adjusting the generator.

16. The system of claim 14, wherein the input profile is from the set of true profiles, and wherein the adjusting the at least one of the discriminator or the generator comprises:

in response to the output determination indicating true, positively adjusting the discriminator; and in response to the output determination false, negatively adjusting the discriminator.

17. The system of claim 14, wherein the generator is further trained by:

supplementing the retrieved set of true profiles with noise to generate a set of training profiles;

generating a set of training embeddings respective of the set of training profiles; and training the generator with the set of training embeddings.

18. The system of claim 14, wherein:

the generator comprises a local generator and a global generator, the discriminator comprises a final discriminator, and the final discriminator is further trained by:

processing the retrieved set of true profiles to derive a set of true local features and a set of true global features;

generating, by the local generator, a set of false local features;

generating, by the global generator, a set of false global features;

training a local discriminator with the set of true local features and the set of false local features;

outputting, by the local discriminator in response to receiving a profile from either the set of true profiles or the set of false profiles as input, a local determination;

training a global discriminator with the set of true global features and the set of false global features;

outputting, by the global discriminator in response to receiving a profile from either the set of true profiles or the set of false profiles as input, a global determination;

training the final discriminator based on the local determination and the global determination.

19. The system of claim 14, wherein the discriminator is further trained based on local features and global features from the set of true profiles and from the set of false profiles.

20. The system of claim 14, further comprising:

in response to the determination, by the discriminator, that the user profile is true, granting the access request.

* * * * *